(12) United States Patent
Holdampf et al.

(10) Patent No.: US 6,382,665 B2
(45) Date of Patent: May 7, 2002

(54) SELF ALIGNING AND LOCKING FASTENER (75) Inventors: Carl John Holdampf, Farmington Hills; Robert Irving Homier, Plymouth; Matthew Martin Bednarski, Brighton, all of MI (US)

(73) Assignee: Magna Seating Systems Inc., Aurora (CA)

( * ) Notice: Subject to any disclaimer, the term of this patent is extended or adjusted under 35 U.S.C. 154(b) by 0 days.

(21) Appl. No.: 09/795,172

(22) Filed: Feb. 28, 2001

Related U.S. Application Data (63) Continuation-in-part of application No. 09/517,393, filed on Mar. 2, 2000.
(60) Provisional application No. 60/123,046, filed on Mar. 5, 1999.

(51) Int. Cl.$^7$ ................................................. B60R 21/22
(52) U.S. Cl. .............................. 280/730.2; 280/730.1; 280/728.1
(58) Field of Search .......................... 280/728.1, 728.2, 280/730.1, 730.2, 733, 743.1; 24/459; 242/585; 297/216.13; 439/741, 747; 248/74.3

(56) References Cited

U.S. PATENT DOCUMENTS

| | | |
|---|---|---|
| 5,074,584 A | 12/1991 | Jarboe |
| 5,533,750 A | 7/1996 | Karlow et al. |
| 5,542,691 A | 8/1996 | Marjanski et al. |
| 5,588,670 A | 12/1996 | Storey et al. |
| 5,588,671 A | 12/1996 | Boumarafi et al. |
| 5,597,176 A | 1/1997 | Kikuchi |
| 5,678,853 A | 10/1997 | Maly |
| 5,810,389 A | 9/1998 | Yamaji et al. |
| 5,816,610 A | 10/1998 | Higashiura et al. |
| 5,833,263 A | 11/1998 | Wittmann et al. |
| 5,876,060 A | 3/1999 | Davidson et al. |
| 5,890,733 A | 4/1999 | Dillon |
| 5,895,070 A | 4/1999 | Crimmins et al. |
| 5,927,749 A | 7/1999 | Homier et al. |
| 5,967,546 A | 10/1999 | Homier et al. |
| 5,967,603 A | 10/1999 | Genders et al. |

FOREIGN PATENT DOCUMENTS

| | | |
|---|---|---|
| GB | 2293355 | 3/1996 |
| WO | WO 98/21063 | * 5/1998 |

* cited by examiner

Primary Examiner—Lanna Mai
Assistant Examiner—Paul Royal, Jr.
(74) Attorney, Agent, or Firm—Howard & Howard (57) ABSTRACT

The invention provides the combination of a seat frame and a cover, having a seam, covering the seat frame. An air bag unit, having an air bag, is disposed inside the cover and is supported by the frame. An intensifier sleeve, having a pair of sheets, sandwiches the air bag therebetween with the sheets being connected to the seam of the cover and supported by the seat frame. A fastener is included and has outboard and inboard portions with the portions being connected the free edges of the sheets. The portions each include a back panel and a series of J-shaped hooks. The seat assembly is characterized by an alignment device disposed on the portions to ensure that the J-shaped hooks are aligned when the J-shaped hooks are interleaved with one another such that the outboard portion is securely interconnected to the inboard portion. This ensures that the sheets are securely supported on the seat frame and that the sheets will remain supported on the seat frame during a deployment of the air bag.

20 Claims, 8 Drawing Sheets

SELF ALIGNING AND LOCKING FASTENER

RELATED APPLICATION

The subject patent application is a Continuation-In-Part of U.S. patent application Ser. No. 09/517,393, filed on Mar. 2, 2000 and entitled "Self Locking Fastener", which in turn claims priority to and all the benefits of United States Provisional Patent Application Ser. No. 60/123,046 filed on Mar. 5, 1999 and entitled "Self Locking Fastener".

FIELD OF THE INVENTION

The subject invention relates to a seat assembly for a vehicle including a side air bag unit and, more specifically, to an interconnecting fastener for securing an intensifier sleeve surrounding the air bag unit.

BACKGROUND OF THE INVENTION

Side impact air bag units that inflate an air bag laterally or to the side of a seat assembly are well known in the prior art. The seat assemblies typically include a seat cover sewn together from a number of separate trim pieces for encapsulating the seat frame and the air bag unit. During deployment of the air bag, the air bag exists through one of the seams in the trim cover.

An intensifier sleeve is frequently used to guide the air bag during deployment. In particular, intensifier sleeves include a pair of sleeve sheets sandwiching the air bag therebetween. Each of the sheets presents a first edge and a second edge. The first edges are sewn into the seam of the trim cover. The second edges are supported by the seat frame. The intensifier sleeve therefore directs the air bag toward the seam of the trim cover such that the air bag will correctly and completely deploy through the seam. An example of such a prior art seat assembly is disclosed in U.S. Pat. No. 5,967,546 to Homier et al., two of the same inventors named herein.

Side impact air bag units employing an intensifier sleeve are housed within a relatively small area in the side of the seat assembly. During the installation of the intensifier sleeve and air bag unit, it is frequently a challenge to accurately and securely mount the intensifier sleeve to the seat frame. A number of different installation techniques have been developed. One method of supporting the intensifier sleeve is disclosed in U.S. Pat. No. 5,588,670 to Storey et al., which merely discloses a pair of basic clamps. These clamps do not provide an easy, quick and error free installation of the intensifier sleeve. Another design for supporting the intensifier sleeve is disclosed in U.S. Pat. No. 5,967,546 to Homier et al. The Homier '546 patent discloses a wire interconnecting two distal ends of the sleeve opposite the seam of the trim cover. This method of attachment, however, may be cumbersome, difficult and time consuming to install considering the confined spaces of the seat assembly.

One improved attachment method provided by the prior art is shown in U.S. Pat. No. 5,967,603 to Genders et al. The Genders et al. '603 patent discloses a pair of J-shaped hooks attached to the second edges of the intensifier sleeve. The hooks, however, may be improperly installed such that only a portion of the hooks are interleaved with each other. Further, the hooks may slide or otherwise move relative to each other such that only a small portion of the hooks remain engaged or the hooks disengage entirely. If the airbag was to deploy when the hooks were only partially engaged or disengaged, the purpose and function of the intensifier sleeve would be defeated such that the airbag may not correctly or completely deploy through the seam in the seat. Further, even if the hooks of the '603 patent were properly interleaved, there are no devices on the hooks to prevent the hooks from sliding or otherwise moving relative to each other and then disconnecting during deployment of the airbag.

An object of this invention is to provide a seat assembly including an air bag unit having an intensifier sleeve and a two part fastener wherein the fastener can be quickly and easily interconnected to securely support the sleeve on a seat frame. Another object of this invention is to provide an alignment device on the fastener for ensuring that the two part fastener is properly aligned and interconnected. Further, another object of the subject invention is to provide a locking mechanism on the fastener for ensuring that the fastener remains locked together during a deployment of the airbag.

SUMMARY OF THE INVENTION AND ADVANTAGES

The deficiencies noted in the prior art are overcome by providing a seat assembly comprising a seat frame with a cover covering the seat frame and including at least one seam. An air bag unit is supported by the seat frame and is disposed inside the cover. The air bag unit includes an air bag. A pair of sheets sandwich the air bag therebetween with each of the sheets having a first edge connected to the seam of the cover and a second edge supported by the seat frame. A fastener is included and has outboard and inboard portions with the outboard portion being connected to one of the second edges of the sheets and the inboard portion being connected to the other of the second edges of the sheets. The outboard and inboard portions each include a back panel and at least one J-shaped hook disposed on the back panel. The assembly is characterized by an alignment device disposed on at least one of the outboard and inboard portions to ensure that the J-shaped hook of the outboard portion is aligned with the J-shaped hook of the inboard portion when the J-shaped hooks are interleaved with one another such that the outboard portion is securely interconnected to the inboard portion, thereby securely supporting the sheets on the seat frame such that the sheets will remain supported on the seat frame during a deployment of the air bag.

Accordingly, the subject invention provides a seat assembly including an air bag unit having a fastener that enables an intensifier sleeve to be quickly, easily and properly supported by a seat frame. Further, the alignment device ensures that the fastener is properly aligned during installation. Preferably the fastener also prevents subsequent misalignment or disconnection such that the fastener remains attached to the seat frame during the life of the seat assembly.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
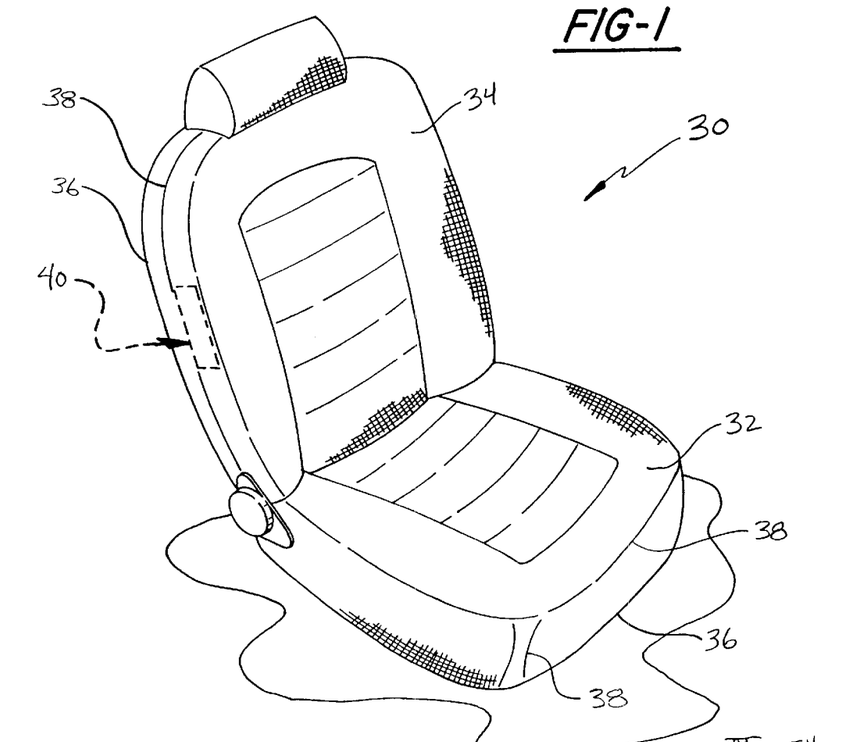
FIG. 1 is a perspective view of a vehicle seat assembly incorporating a side impact air bag unit.

Referring to the Figures, wherein like numerals indicate like or corresponding parts throughout the several views, a vehicle seat assembly is generally shown at 30 in FIG. 1. The seat assembly 30 includes a seat cushion 32 and a seat back 34 with both the cushion 32 and back 34 covered by a cover 36. The cover 36 may be of any suitable material such as cloth, leather, vinyl or the like. As is known in the seat manufacturing art, the covers 36 are typically formed of a number of separate trim pieces which are sewn together defining a plurality of seams 38. In particular, the seams 38 are defined by stitches. As will be appreciated, the subject invention is by no way limited to a particular type, style or design of seat assembly.

The seat assembly 30 includes a side impact air bag unit 40. The air bag unit 40 illustrated deploys from the side or bolster section of the seat assembly 30 in order to protect the occupant from side impacts. As will be appreciated, the subject invention may be used for other air bag unit configurations and locations.

Figure 2:
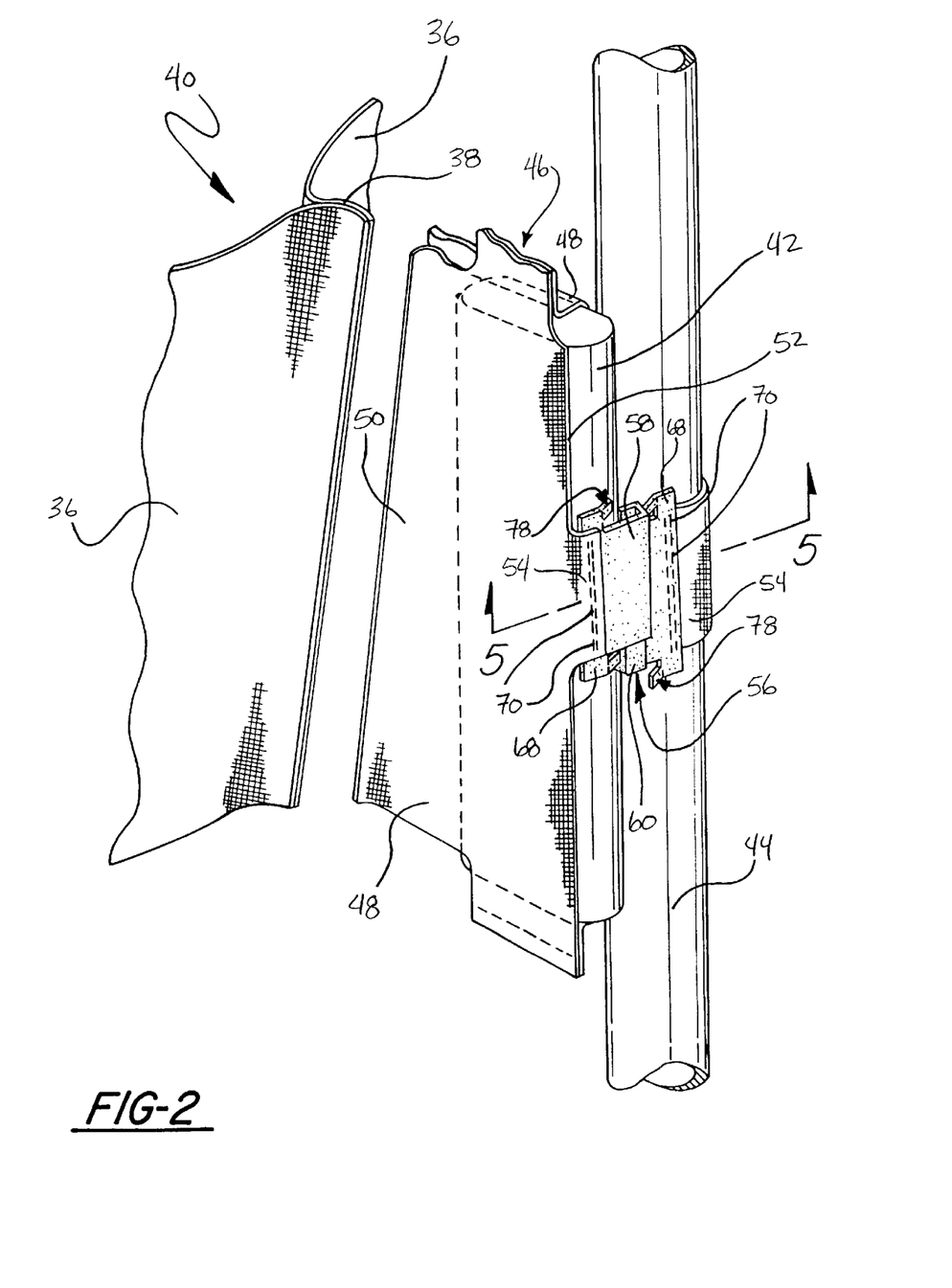
FIG. 2 is a fragmentary perspective view of the side impact air bag unit incorporating an interconnecting fastener of the subject invention.
Figure 3:
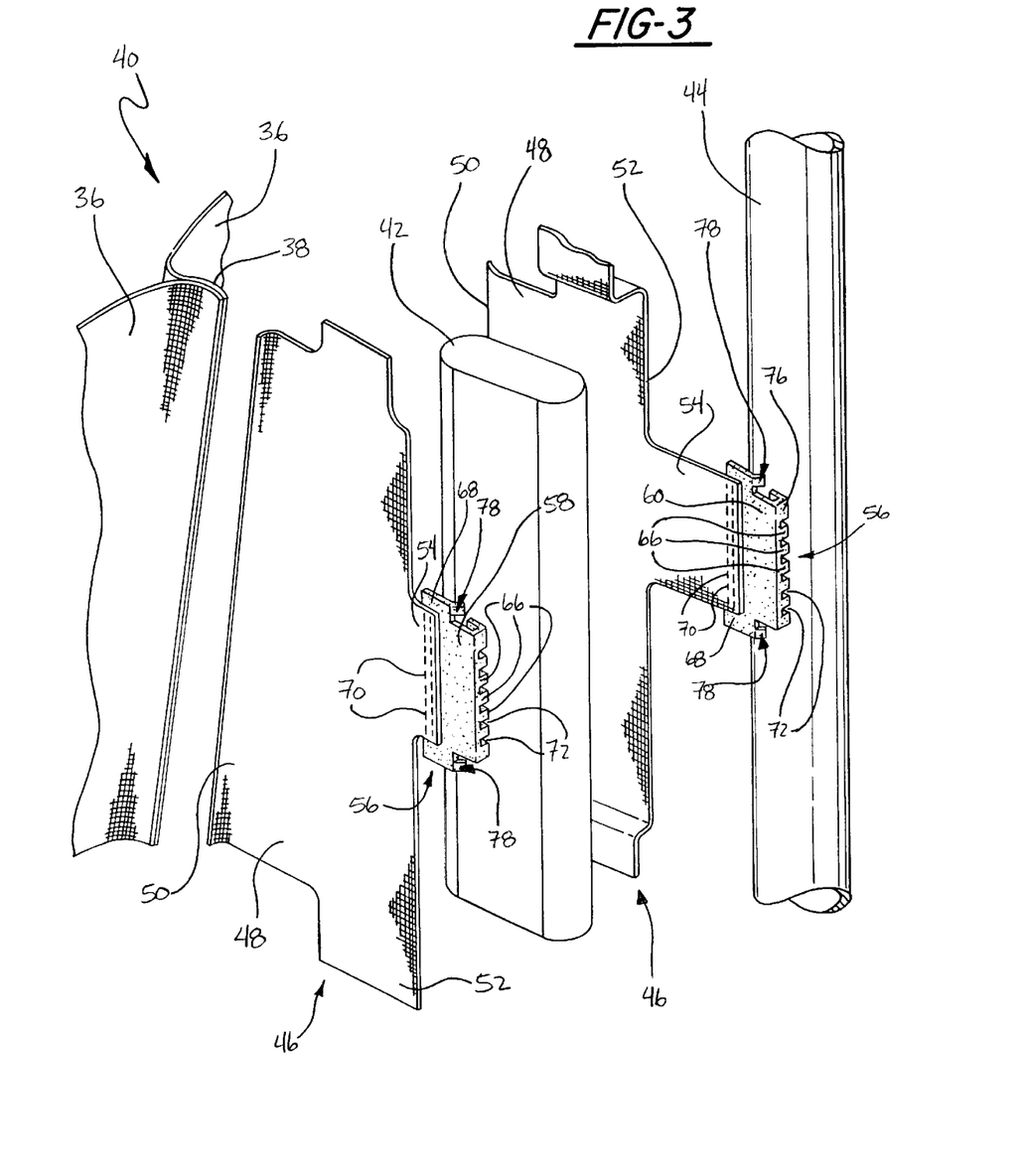
FIG. 3 is a view similar to FIG. 2 with the components thereof in an exploded relationship.

Referring to FIGS. 2 and 3, the air bag unit 40 includes an air bag canister 42 which is mounted to a seat frame 44. The seat frame 44 is shown as a tubular member. Alternatively, the seat frame 44 may be of any suitable construction. The seat frame 44 is part of an overall seat frame that forms corresponding parts of the seat cushion 32 and seat back 34.

The air bag canister 42 of the subject invention includes an opening (not shown) wherein an air bag (not shown) is designed to deploy through the cover 36 covering the seat frame 44. Specifically, the air bag is designed to deploy through the seam 38 defined by the stitch connecting two pieces of the cover material 36. The particular design, size or configuration of the air bag canister 42 and air bag are in no way limited by the illustrated embodiment.

An intensifier sleeve 46 surrounds the opening and the air bag to direct the air bag into the seam 38 of the cover 36. The intensifier sleeve 46 is defined by two sheets or pieces 48 wherein each piece or sheet 48 has a first end or edge 50 and a second end or edge 52.

Figures 4, 5:
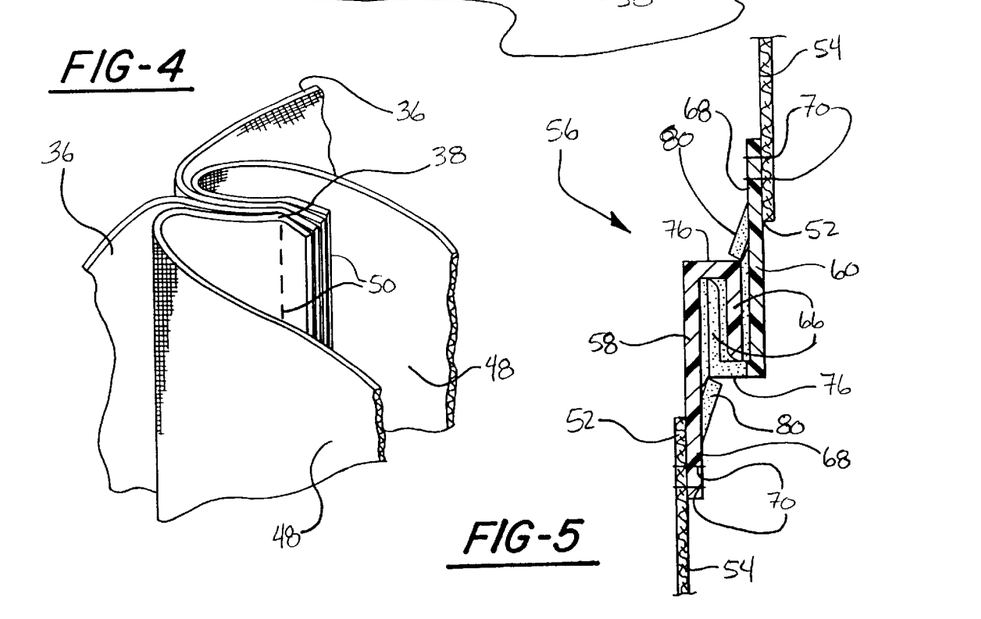
FIG. 4 is an enlarged fragmentary perspective view of a portion of an intensifier sleeve stitched into a seam of a trim cover.
FIG. 5 is a sectional view taken along line 5—5 of FIG. 2.
Figure 6:
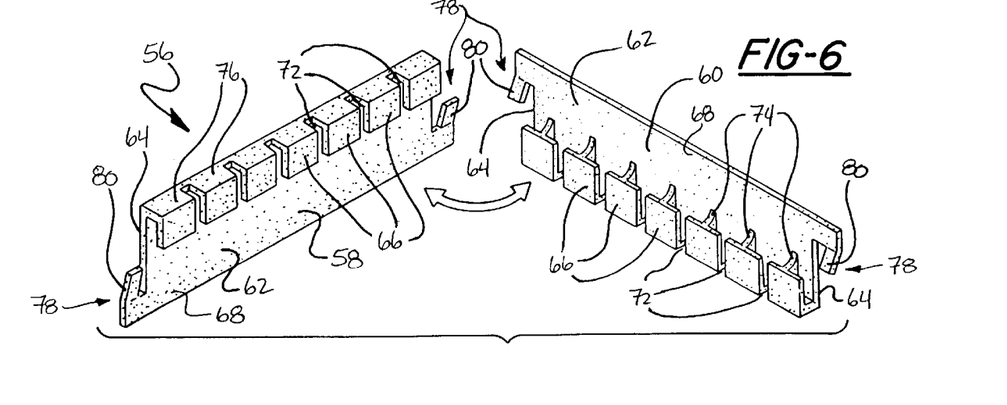
FIG. 6 is a perspective view of the fastener having outboard and inboard portions.
Figure 7:
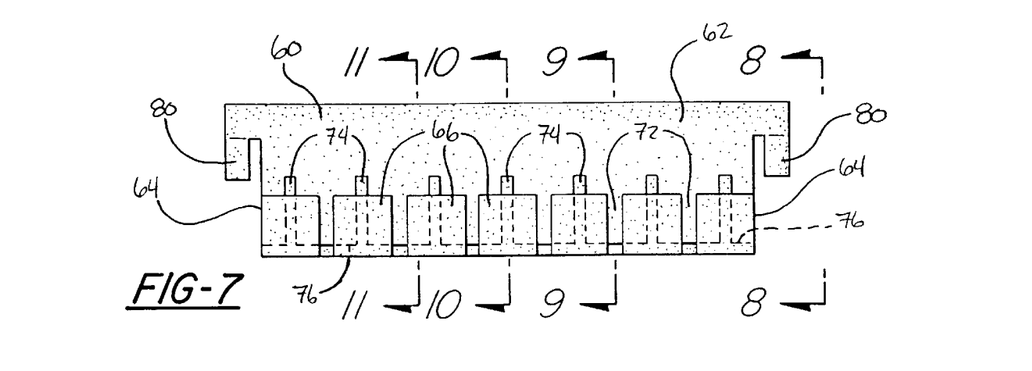
FIG. 7 is a front view of the inboard portion of the fastener shown in FIG. 6.
Figure 8:
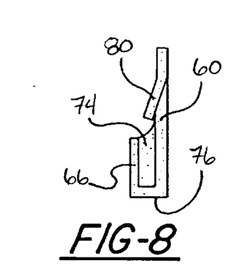
FIG. 8 is an end view of the fastener taken along line 8—8 of FIG. 7.
Figure 9:
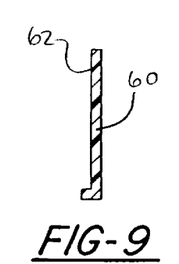
FIG. 9 is a sectional view taken along line 9—9 of FIG. 7.
Figure 10:
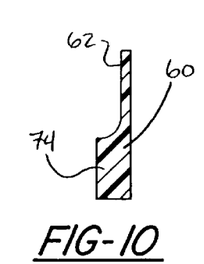
FIG. 10 is a sectional view taken along line 10—10 of FIG. 7.
Figure 11:
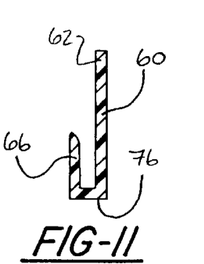
FIG. 11 is a sectional view taken along line 11—11 of FIG. 7.

For illustrative purposes, FIGS. 2 and 3 show the seam 38 of the cover 36 in a spaced relationship from the first ends 50 of the sleeve sheets 48. As appreciated, the first ends 50 of the sheets 48 would be stitched together in a sandwiched fashion with the seam 38 on the cover 36. The preferred stitching configuration is best shown in FIG. 4. The sheets 48, however, may be affixed to the seam 38 of the cover 36 by any suitable means.

The sheets 48 of the intensifier sleeve 46 are preferably made of a nylon type material which is stronger than the stitch material of the cover 36 and the air bag itself. The strength of the sheets 48 is particularly important during the deployment of the air bag.

During deployment, the air bag expands in a quick and volatile manner. The intensifier sleeve 46 directs the air bag toward the seam 38 of the cover 36. The expansion forces load the sheets 48 of the intensifier sleeve 46 in tension such that the seam 38 of the cover 36 tears open as the stitch material breaks. This opens a path for the air bag to follow as the air bag emerges from the seat assembly 30 to a fully deployed position. This type of deployment is known in the art as is discussed in the background section.

Due to the volatile nature of the air bag deployment, the sheets 48 of the intensifier sleeve 46 should be securely supported by the seat frame 44. Preferably, the second ends 52 of the two sheets 48 each include extensions or tabs 54 which extend around the air bag canister 42 and are connected together around the seat frame 44. As illustrated, one of the extensions 54 may be longer than the other extension 54 in order to surround the desired portion of the seat frame 44.

A fastener, generally shown at 56, securely supports the two second ends 52 of the intensifier sleeve 46 around the seat frame 44. As will be appreciated, the fastener 56 may be used in a variety of environments and the side impact air bag unit 40 is simply illustrative of one environment. Other environments may include different air bag unit configurations, air bag unit positions, seat trim attachments around seat cushions and seat backs, and/or cover attachments.

The fastener 56 includes an elongated outboard portion 58 and an elongated inboard portion 60 which interconnect together. As shown in the embodiment of FIGS. 2 through 11, the outboard 58 and inboard 60 portions are identical to each other which reduces the possibility of installation error. The portions 58, 60, however, are in now way limited to being identical, such as will be discussed in greater detail below with reference to the embodiment of FIGS. 12–22.

Referring in particular to FIGS. 5 through 11, the first embodiment of the outboard 58 and inboard 60 portions is shown in greater detail. The inboard 60 and outboard 58 portions each include a back panel 62 extending in a strip between opposite distal ends 64. A plurality of J-shaped hooks 66 preferably extend across the entire length of and between the ends 64 of each back panel 62. Preferably, the J-shaped hooks 66 are disposed in a side by side relationship between the opposite ends 64. The back panels 62 have upper and lower edges with the upper edge extending beyond the J-shaped hooks 66 to provide a flat connecting section 68 along the upper edge.

As best shown in FIGS. 1 and 5, the flat connection section 68 of the outboard portion 58 is sewn by stitches to one of the second ends 52 of the sleeve sheet 48. The stitches formed by the outboard portion 58 and the second end 52 of the intensifier sleeve 46 define a seam 70. Similarly, the flat connecting section 68 of the inboard portion 60 is sewn by stitches to the other second end 52 of the other sleeve sheet 48. The stitches formed by the inboard portion 60 and the other second end 52 of the corresponding sheet 48 likewise define a seam 70. Hence, the seams 70 connect the back panels 62 of the outboard 58 and inboard 60 portions to the respective second edges 52 of the sleeve sheets 48. The outboard 58 and inboard 60 portions may, however, be secured to the respective ends 52 of the intensifier sleeve sheets 48 by any suitable means, including an adhesive, rivets or the like.

The outboard 58 and inboard 60 portions are formed of a polymeric, preferably plastic, material. In particular, the portions 58, 60 are formed of a relatively flexible plastic material such that the stitches can be sewn into the flat connecting sections 68 without breaking or otherwise damaging the portions 58, 60. The plastic material of the portions 58, 60 is also sufficiently rigid to withstand significant pulling forces in all weather conditions.

A plurality of slots 72 are formed between the hooks 66 to provide separation between adjacent hooks 66. A support rib 74 extends from the back panel 62 to each of the hooks 66 to provide support for the corresponding hook 66 in spaced relationship to the back panel 62. Preferably, the ribs 74 are centrally located on each of the hooks 66. The J-shaped hooks 66 include a base 76 for engaging opposing J-shaped hooks 66 of an opposing back panel 62. It should be appreciated that the exact configuration of the hooks 66 as described above may be modified without deviating from the overall scope of the subject invention.

A locking mechanism 78 is disposed on at least one of the panels 62 of the portions 58, 60 for locking the outboard 58 and inboard 60 portions together. The locking mechanism 78 includes at least one resilient locking finger 80 extending outwardly from at least one of the opposite ends 64 of the panels 62. Preferably, the locking mechanism 78 includes a resilient locking finger 80 extending from each of the opposite ends 64 at the upper edges of each of the panels 62. Hence, both the outboard 58 and inboard 60 portions include a pair of locking fingers 80. The locking fingers 80 are resiliently formed inwardly toward the J-shaped hooks 66. The particular configuration and number of locking mechanisms 78 may be modified without deviating from the overall scope of the subject invention.

To interconnect the outboard 58 and inboard 60 portions, the J-shaped hooks 66 on the back panel 62 of the outboard portion 58 are interleaved with the J-shaped hooks 66 on the back panel 62 of the inboard portion 60. In particular, the ribs 74 of the outboard portion 58 are disposed in the slots 72 of the inboard portion 60 and similarly the ribs 74 of the inboard portion 60 are disposed in the slots 72 of the outboard portion 58.

Once interlocked, the ribs 74 and slots 72 of the outboard portion 58 are shifted from the ribs 74 and slots 72 of the inboard portion 60 such that the inboard 60 and outboard 58 portions may be locked together. In other words, when a user locks the two portions 58, 60 together, the hooks 66 engage each other and the ribs 74 engage the corresponding slots 72. This rib 74 and slot 72 engagement prevents the inboard 60 and outboard 58 portions from sliding end to end relative to each other. FIGS. 8–11 illustrate various sectional views of the J-shaped hook 66, rib 74, and slot 72.

The locking of the inboard 60 and outboard 58 portions occurs because of the locking fingers 80. Specifically, as a user pushes the two portions 58, 60 together, the corresponding hooks 66 engage each other and the ribs 74 engage the corresponding slots 72. As the corresponding hooks 66 slide into engagement, the fingers 80 are pushed toward the respective back panel 62. Specifically, the hooks 66 of the inboard portion 60 that are directly adjacent the ends 64 of the back panel 62 push against the fingers 80 of the outboard portion 58. Similarly, the hooks 66 of the outboard portion 58 that are directly adjacent the ends 64 of the back panel 62 push against the fingers 80 of the inboard portion 60. When the hooks 66 are fully engaged, the fingers 80 snap back into position behind an adjacent hook 66. Specifically, at least one of the fingers 80 of the outboard portion 58 engages one of the bases 76 of the inboard portion 60. Additionally, at least one of the fingers 80 of the inboard portion 60 engages one of the bases 76 of the outboard portion 58. As such, the fingers 80 and the respective hooks 66 cooperate to secure the two portions 58, 60 together. As illustrated in the preferred embodiment, the identical portions 58, 60 are offset when interlocked such that only one finger 80 of each portion 58, 60 engages an opposing base 76. The engaged configuration of the fastener 56 is best shown in FIGS. 2 and 5.

To unlock the inboard portion 60 from the outboard portion 58 the user must bias the fingers 80 toward the back panel 62 to disengage the fingers 80 from the corresponding bases 76.

Figure 12:
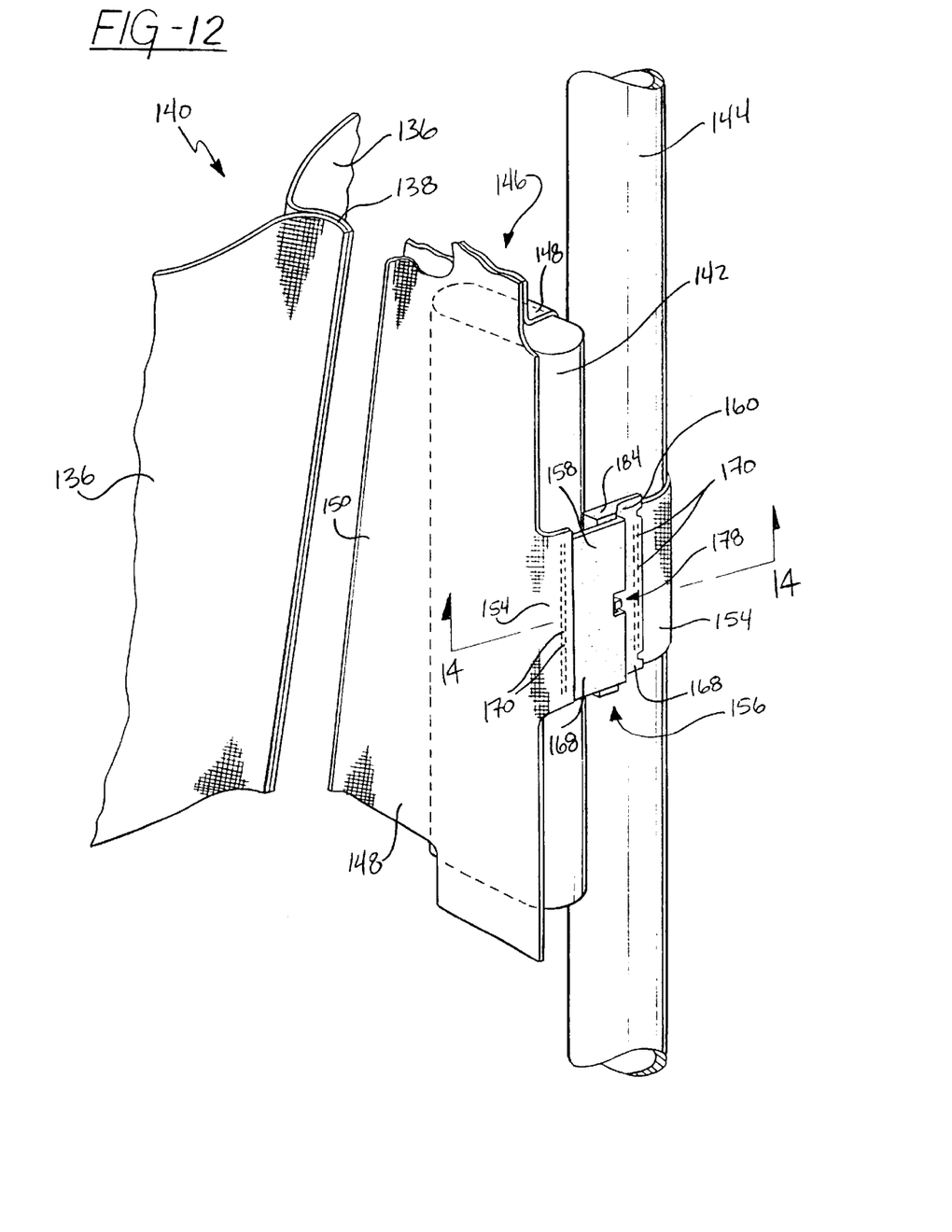
FIG. 12 is a fragmentary perspective view of the side impact air bag unit incorporating another embodiment of an interconnecting fastener in accordance with the subject invention.
Figure 13:
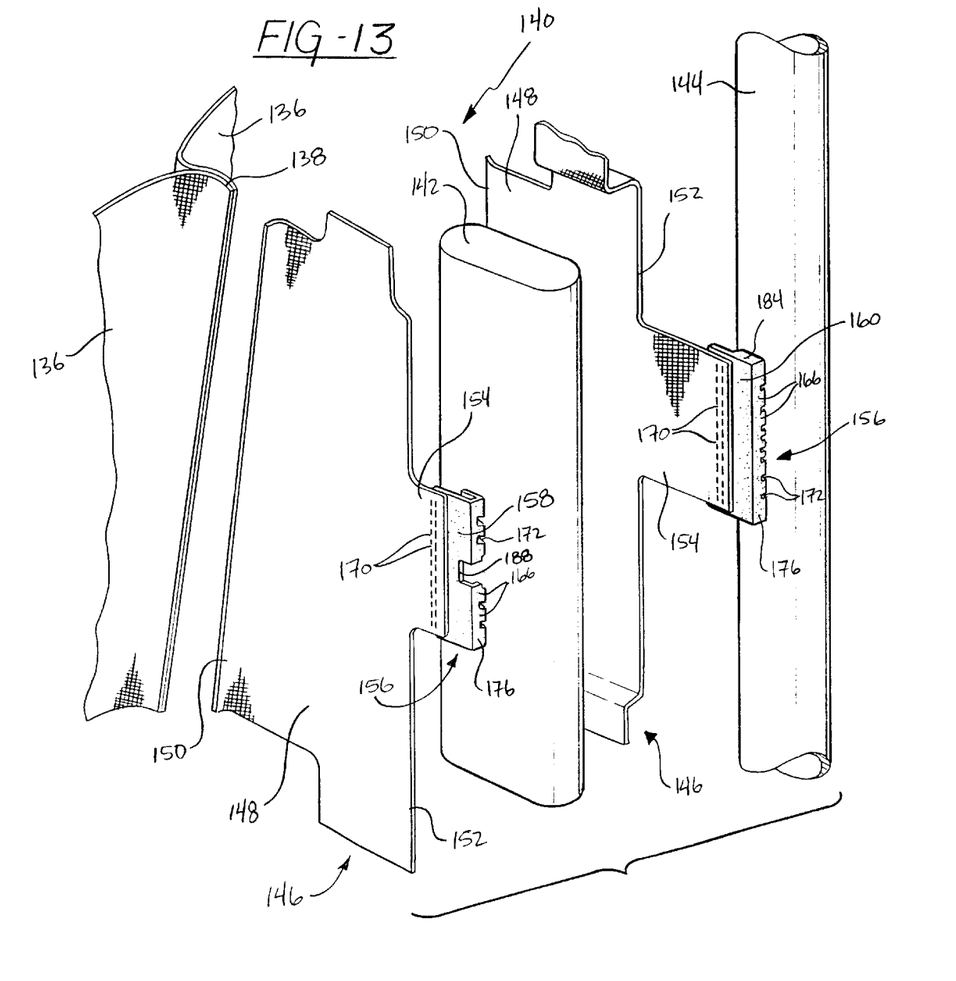
FIG. 13 is a view similar to FIG. 12 with the components thereof in an exploded relationship.

Referring now to FIGS. 12–22, another embodiment of a fastener, generally shown at 156, is shown wherein like numerals increased by 100 indicate like or corresponding parts. As shown in FIGS. 12 and 13, the fastener 156 of this embodiment is also designed to securely support second ends or edges 152 of an intensifier sleeve 146 around a seat frame 144. The fastener 156 similarly includes elongated outboard 158 and inboard 160 portions with the outboard portion 158 being connected to one of the second edges 152 of the sheets 148 and the inboard portion 160 being connected to the other of the second edges 152 of the sheets 148.

Figure 21:
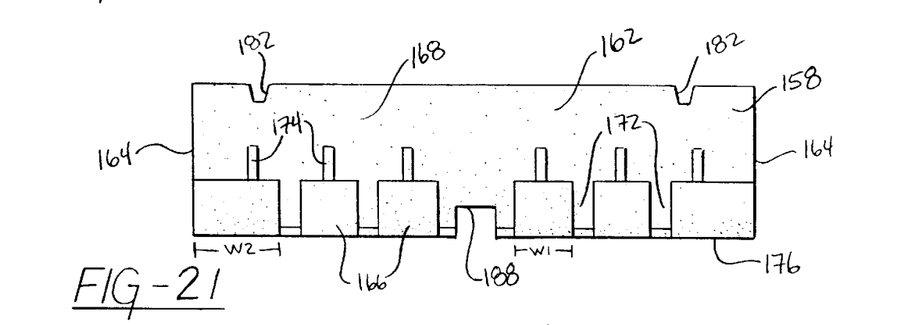
FIG. 21 is a front view of the outboard portion of the fastener shown in FIG. 15.
Figure 22:
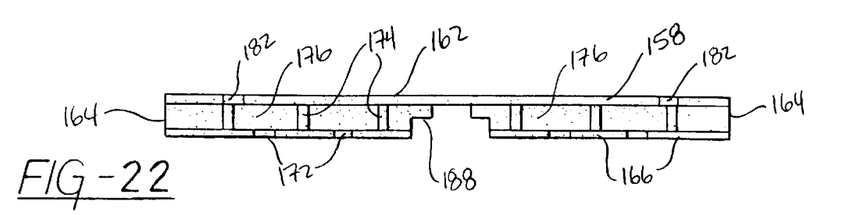
FIG. 22 is a top view of the outboard portion of the fastener shown in FIG. 15.

Referring also to FIGS. 14–22, the outboard 158 and inboard 160 portions are shown in greater detail. In particular, FIG. 14 discloses a sectional view of interleaved outboard 158 and inboard 160 portions while FIG. 15 discloses the outboard 158 and inboard 160 portions in spaced relationship to each other. FIGS. 16–22 illustrate additional views of the outboard 158 and inboard 160 portions. Specifically, FIGS. 16–20 illustrate further details of the inboard portion 160 while FIGS. 21 and 22 illustrate further details of the outboard portion 158. It should be noted that the outboard 158 and inboard 160 portions have similar cross sections such that the sectional views of FIGS. 17–19 can be analogized to either of the portions 158, 160.

Figure 15:
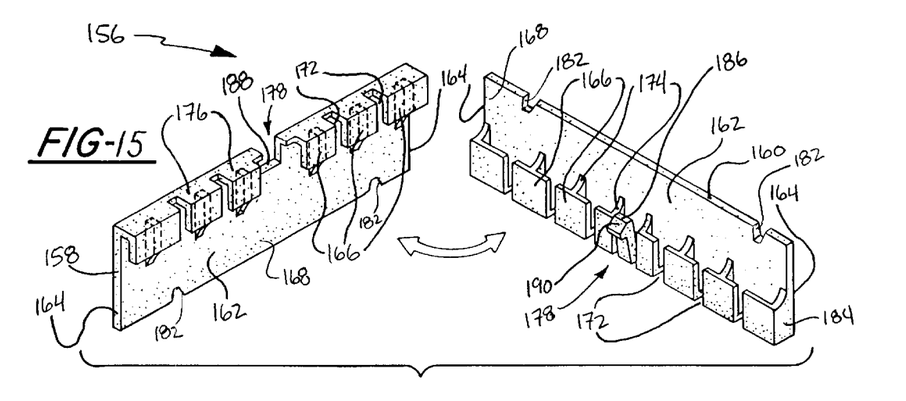
FIG. 15 is a perspective view of the fastener of FIG. 12 having outboard and inboard portions.
Figure 16:
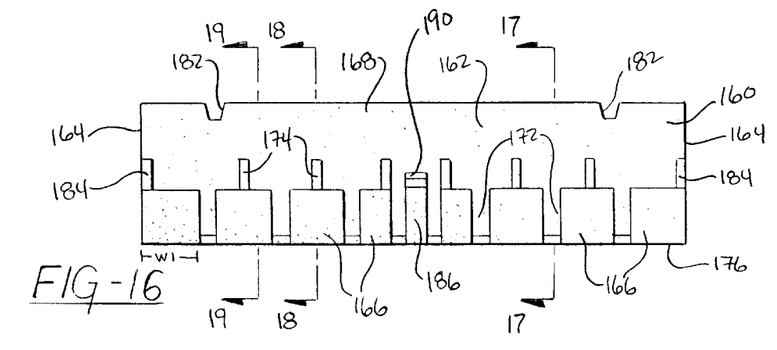
FIG. 16 is a front view of the inboard portion of the fastener shown in FIG. 15.
Figure 17:
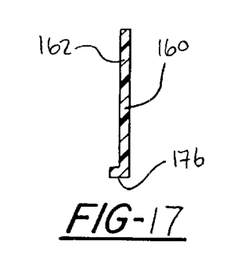
FIG. 17 is a sectional view taken along line 17—17 of FIG. 16.
Figure 18:
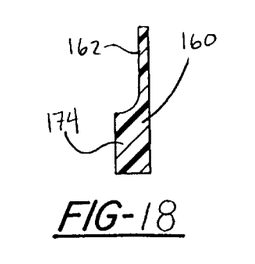
FIG. 18 is a sectional view taken along line 18—18 of FIG. 16.
Figure 19:
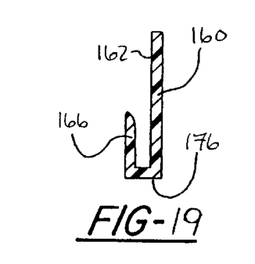
FIG. 19 is a sectional view taken along line 19—19 of FIG. 16.
Figure 20:
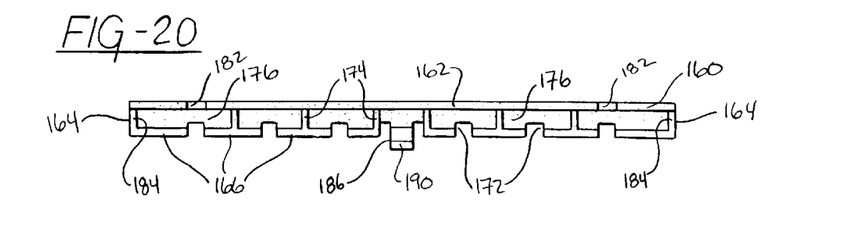
FIG. 20 is a top view of the inboard portion of the fastener shown in FIG. 15.

The outboard 158 and inboard 160 portions each include a back panel 162 extending in a strip between opposite distal ends 164. At least one J-shaped hook 166 is disposed on each of the back panels 162. Preferably a plurality of J-shaped hooks 166 extend across an entire length of each back panel 162 and are disposed in side by side relationship between the opposite ends 164. Each of the back panels 162 have upper and lower edges with the upper edge extending beyond the J-shaped hooks 166 to provide a flat connecting section 168 along the upper edge. Each of the J-shaped hooks 166 include a base 176 for engaging opposing J-shaped hooks 166 of the opposite back panel 162.

As also discussed above with reference to the first embodiment, the flat connection section 168 of the outboard portion 158 is sewn by stitches to one of the second ends 152 of the sleeve sheet 148. The stitches formed by the outboard portion 158 and the second end 152 of the intensifier sleeve 146 define a seam 170, which is shown in FIGS. 12 and 13. Similarly, the flat connecting section 168 of the inboard portion 160 is sewn by stitches to the other second end 152 of the other sleeve sheet 148. The stitches formed by the inboard portion 160 and the other second end 152 of the corresponding sheet 148 likewise define a seam 170, see FIGS. 12 and 13. Hence, the seams 170 connect the back panels 162 of the outboard 158 and inboard 160 portions to the respective second edges 152 of the sleeve sheets 148. A pair of V-shaped guides 182 are formed within the flat connection sections 168 to assist in proper alignment of the respective second edges 152 of the sheets 148. In particular, the guides 182 provide a visual locator to ensure that the second edges 152 are properly sewn to the flat connection sections 168. The outboard 158 and inboard 160 portions may be secured to the respective second ends 152 of the intensifier sleeve sheets 148 by any suitable means, including an adhesive, rivets or the like. Further, the guides 182 may be of any suitable design and may be etched, cut, printed, or otherwise disposed on the flat connection sections 168.

The seat assembly of the second embodiment is characterized by an alignment device disposed on at least one of the outboard 158 and inboard 160 portions. The alignment device ensures that the J-shaped hook 166 of the outboard portion 158 is aligned with the J-shaped hook 166 of the inboard portion 160 when the J-shaped hooks 166 are interleaved with one another such that the outboard portion 158 is securely interconnected to the inboard portion 160. The secure connection of the portions 158, 160 in turn securely supports the intensifier sheets 148 on the seat frame such that the sheets 148 will remain supported on the seat frame 144 during a deployment of the air bag. As discussed above, the deployment of the airbag is a volatile event such that a secure connection is important to the proper operation of the intensifier sleeve 146 and air bag. As a visual confirmation of a proper interconnection, the inboard 160 and outboard 158 portions may be of contrasting colors, such as black and white, which would assist in determining if the two portions 158, 160 are fully interconnected.

As will be discussed, the alignment device takes various forms which can be used independently of each other or in various combinations. For example, the alignment device is further defined as a support rib 174 extending from the back panel 162 of one of the inboard 160 and outboard 158 portions and supporting the corresponding J-shaped hook 166. The other of the inboard 160 and outboard 158 portions defines a slot 172 for accepting the rib 174 when the J-shaped hooks 166 of the portions 158, 160 are interleaved with one another. Preferably, support ribs 174 extend from the back panel 162 of the outboard portion 158 supporting the row of corresponding J-shaped hooks 166. The inboard portion 160 defines a series of slots 172 separating adjacent J-shaped hooks 166 with the slots 172 accepting the ribs 174 of the outboard portion 158 when the J-shaped hooks 166 of the portions 158, 160 are interleaved with one another. Similarly, support ribs 174 extend from the back panel 162 of the inboard portion 160 supporting the row of corresponding J-shaped hooks 166. The outboard portion 158 defines a series of slots 172 separating adjacent J-shaped hooks 166 with the slots 172 accepting the ribs 174 of the inboard portion 160 when the J-shaped hooks 166 of the portions 158, 160 are interleaved with one another. Hence, both of the inboard 160 and outboard 158 portions include cooperating ribs 174 and slots 172 and preferably the ribs 174 and slots 172 are disposed along the J-shaped hooks 166 in an alternating fashion. The alternating ribs 174 and slots 172 are positioned in such a manner such that there is only one way to interconnect the inboard portion 160 to the outboard portion 158. Preferably, each of the ribs 174 are centrally located on each of the J-shaped hooks 166. It should be appreciated that the exact configuration of the hooks 166, ribs 174, and slots 172 as described may be modified without deviating from the overall scope of the subject invention.

Another alignment device, which may work in conjunction with the ribs 174 and slots 172, is having a first J-shaped hook 166 on at least one of the outboard 158 and inboard 160 portions include a first width W1 and a second J-shaped hook 166 on one of the outboard 158 and inboard 160 portions include a second width W2. The first W1 and second W2 widths are best shown in FIGS. 16 and 21. The second width W2 is larger than the first width W1 such that the second J-shaped hook 166 is prevented from interleaving with the first J-shaped hook 166. As best shown in FIG. 21, the wider second J-shaped hook 166 is illustrated on the outboard portion 158. Preferably, the wider second J-shaped hook 166 is disposed at each of the opposite ends 164 of the back panel 162 of the outboard portion 158. The inboard portion 160 has wider spaced ribs 174 to accommodate the wider second J-shaped hooks 166. Specifically, the wider spaced ribs 174 are between a rib 174 at the opposite end 164 of the panel 162 and the adjacent internal rib 174. The configuration of different sized hooks 166 further ensures the alignment of the inboard 160 and outboard 158 portions. It should be appreciated that the wider J-shaped hooks 166 may be on either or both of the outboard 158 and inboard 160 portions.

In another example, the alignment device is further defined as an end wall 184 mounted to each of the opposite ends 164 of the back panel 162 on one of the portions 158, 160 such that the J-shaped hooks 166 of both of the portions 158, 160 are disposed between the end walls 184 when the J-shaped hooks 166 are interleaved with one another. The end walls 184 are preferably the same configuration as the support ribs 174 such that the outer second J-shaped hooks 166 are actually supported by a pair of ribs 174. As illustrated, the end walls 184 are mounted to each of the opposite ends 164 of the back panel 162 of the outboard portion 158. It should be appreciated that the end walls 184 may be alternatively mounted to the inboard portion 160.

A further example includes the alignment device being further defined as locking mechanism 178 disposed on at least one of the back panels 162 of the inboard 160 and outboard 158 portions. The locking mechanism 178 also locks the outboard 158 and inboard 160 portions together when the portions 158, 160 are interleaved with one another. The locking mechanism 178 includes a resilient locking finger 186 extending from at least one of the inboard 160 and outboard 158 portions with a corresponding notch 188 formed within the other of the inboard 160 and outboard 158 portions. Preferably, the locking finger 186 extends from the lower edge of the inboard portion 160 with the notch 188 formed in the outboard portion 158 such that the finger 186 engages the notch 188 during the locking of the portions 158, 160. As illustrated, the finger 186 and notch 188 are centrally formed between the plurality of J-shaped hooks 166. It should be appreciated that the finger 186 and notch 188 may be formed at any suitable position along either of the outboard 158 and inboard 160 portions.

The finger 186 is biased to maintain locking engagement between the outboard 158 and inboard 160 portions. A cam 190 is provided on the locking finger 186 such that the two portions 158, 160 are easy to assemble by hand. The locking finger 186, along with the cam 190, has a thickness which is greater than the depth of the base 176 of the J-shaped hooks 166. In other words, the space between the J-shaped hooks 166 and the corresponding back panel 162, i.e., the depth of the base 176, is smaller than the thickness of the locking finger 186 such that the thicker locking finger 186 cannot interlay within the J-shaped hook 166. Further, the locking finger 186 is preferably wider than the slots 172 separating the J-shaped hooks 166 such that the wider locking finger 186 cannot be disposed within the slots 172. The particular thickness and width of the locking finger 186 assists in ensuring that the locking finger 186 will properly act as an alignment device and will only engage the adequately sized notch 188. It should be noted that the particular configuration of the locking mechanism 178 may be modified and there may be more than one locking mechanism 178 disposed on either one or both of the outboard 158 and inboard 160 portions.

The outboard 158 and inboard 160 portions of this embodiment are dissimilar, hence, the portions 158, 160 are not reversible and can only be locked together in one way. This design therefore assists in ensuring that the fastener 156 is correctly interlocked each and every time.

To interconnect the outboard 158 and inboard 160 portions, the J-shaped hooks 166 on the back panel 162 of the outboard portion 158 are interleaved with the J-shaped hooks 166 on the back panel 162 of the inboard portion 160. In particular, the ribs 174 of the outboard portion 158 are aligned and disposed in the slots 172 of the inboard portion 160 and similarly the ribs 174 of the inboard portion 160 are aligned and disposed in the slots 172 of the outboard portion 158.

Once interconnected, the ribs 174 and slots 172 of the outboard portion 158 are shifted from the ribs 174 and slots 172 of the inboard portion 160. Hence, when an installer locks the two portions 158, 160 together, the hooks 166 engage each other and the ribs 174 engage the corresponding slots 172. In addition to guiding the portions 158, 160 together in proper alignment, this rib 174 and slot 172 engagement also prevents the inboard 160 and outboard 158 portions from sliding end to end relative to each other.

Figure 14:
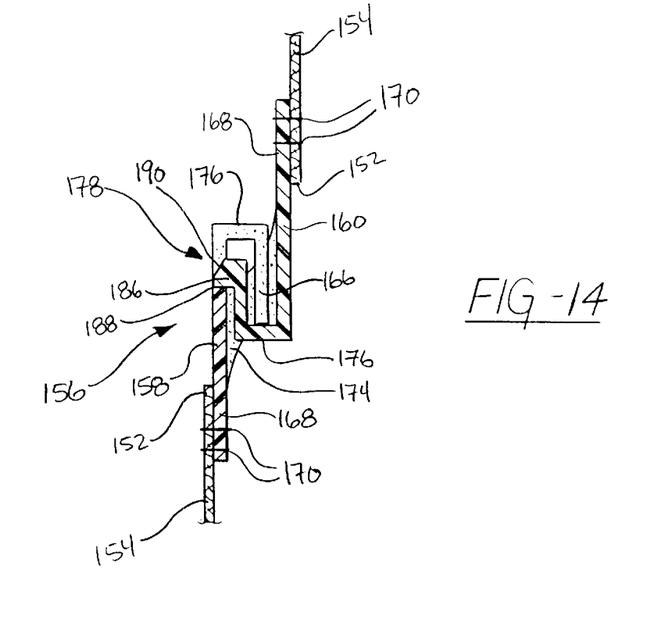
FIG. 14 is a sectional view taken along line 14—14 of FIG. 12.

The inboard 160 and outboard 158 portions can also be interlocked by making use of the locking mechanism 178. Specifically, as an installer pushes the two portions 158, 160 together and the corresponding hooks 166 slide into engagement, the locking finger 186 engages a portion of the back panel 162 of the outboard portion 158 and is pushed inward toward the back panel 162 of the inboard portion 160. When the hooks 166 are fully engaged, the finger 186 snaps back into position through the notch 188 and engages a bottom surface of the notch 188. As such, the locking finger 186, notch 188, and the J-shaped hooks 166 cooperate to secure the two portions 158, 160 together. The engaged configuration of the fastener 156 is best shown in FIG. 14.

To unlock the two portions 158, 160, a user pushes on the finger 186 until the finger 186 disengages the notch 188. The inboard 160 and outboard 158 portions can now be pulled apart. As discussed above, there may be multiple locking mechanisms 178 such that the portions 158, 160 can be further interlocked and a user would be required to disengage multiple fingers 186 from their respective notches 188.

The invention has been described in an illustrative manner, and it is to be understood that the terminology as used is intended to be in the nature of words of description rather than of limitation. Many modifications and variations of the present invention are possible in light of the above teachings. It is, therefore, to be understood that within the scope of the appended claims the invention may be practiced otherwise than as specifically described.

What is claimed is:

1. A seat assembly for a vehicle comprising:
   a seat frame,
   a cover covering said seat frame and including at least one seam,
   an air bag unit supported by said seat frame and disposed inside said cover, said air bag unit including an air bag,
   a pair of sheets sandwiching said air bag therebetween, each of said sheets having a first edge connected to said seam of said cover and a second edge supported by said seat frame, and
   a fastener having outboard and inboard portions with said outboard portion being connected to one of said second edges of said sheets and said inboard portion being connected to the other of said second edges of said sheets, said outboard and inboard portions each including a back panel and at least one J-shaped hook disposed on said back panel,
   said assembly characterized by an alignment device disposed on at least one of said outboard and inboard portions to ensure that said J-shaped hook of said outboard portion is aligned with said J-shaped hook of said inboard portion when said J-shaped hooks are interleaved with one another, thereby supporting said sheets on said seat frame.

2. An assembly as set forth in claim 1 wherein said alignment device is further defined as a support rib extending from said back panel of one of said inboard and outboard portions supporting said corresponding J-shaped hook, and the other of said inboard and outboard portions defining a slot for accepting said rib when said J-shaped hooks of said portions are interleaved with one another.

3. An assembly as set forth in claim 1 wherein said back panels of said inboard and outboard portions extend in a strip between opposite ends and said alignment device is further defined as an end wall mounted to each of said opposite ends of said back panel on one of said portions such that said J-shaped hooks of said portions are disposed between said end walls when said J-shaped hooks are interleaved with one another.

4. An assembly as set forth in claim 1 wherein said back panels and said J-shaped hooks of said inboard and outboard portions extend in a strip between opposite ends and said alignment device is further defined as an end wall mounted to said opposite ends of said J-shaped hook on one of said portions such that said J-shaped hooks of said portions are disposed between said end walls when said J-shaped hooks of said portions are interleaved with one another.

5. An assembly as set forth in claim 1 wherein said alignment device is further defined as a locking mechanism extending from at least one of said inboard and outboard portions.

6. An assembly as set forth in claim 1 wherein said alignment device is further defined as a locking finger extending from at least one of said inboard and outboard portions with a corresponding notch formed within the other of said inboard and outboard portions.

7. An assembly as set forth in claim 1 wherein said back panels of said inboard and outboard portions extend in a strip between opposite ends and a plurality of J-shaped hooks are disposed in side by side relationship between said opposite ends.

8. An assembly as set forth in claim 7 wherein each of said J-shaped hooks include a base for engaging opposing J-shaped hooks of the opposite back panel.

9. An assembly as set forth in claim 7 wherein said alignment device is further defined as support ribs extending from said back panel of said outboard portion supporting said corresponding J-shaped hooks, and said inboard portion defining a series of slots separating adjacent J-shaped hooks with said slots accepting said ribs when said J-shaped hooks of said portions are interleaved with one another.

10. An assembly as set forth in claim 9 wherein said alignment device is further defined as support ribs extending from said back panel of said inboard portion supporting said corresponding J-shaped hooks, and said outboard portion defining a series of slots separating adjacent J-shaped hooks with said slots accepting said ribs of said inboard portion when said J-shaped hooks of said portions are interleaved with one another.

11. An assembly as set forth in claim 10 wherein said ribs and slots of said inboard and outboard portions are disposed along said J-shaped hooks in an alternating fashion.

12. An assembly as set forth in claim 11 wherein each of said ribs is centrally located on each of said J-shaped hooks.

13. An assembly as set forth in claim 12 wherein a first J-shaped hook on at least one of said outboard and inboard portions includes a first width and a second J-shaped hook on one of said outboard and inboard portions includes a second width with said second width being larger than said first width such that said second J-shaped hook is prevented from interleaving with said first J-shaped hook, thereby further ensuring said alignment of said inboard and outboard portions.

14. An assembly as set forth in claim 13 wherein said second J-shaped hook is disposed at each of said opposite ends of said back panel of one of said outboard and inboard portions.

15. An assembly as set forth in claim 14 further including an end wall mounted to each of said opposite ends of said back panel of one of said outboard and inboard portions such that said first and second J-shaped hooks of said portions are disposed between said end walls when said J-shaped hooks of said portions are interleaved with one another.

16. An assembly as set forth in claim 10 further including a locking mechanism disposed on at least one of said back panels of said portions for locking said outboard and inboard portions together when said portions are interleaved with one another.

17. An assembly as set forth in claim 16 wherein each of said back panels have upper and lower edges with said upper edge extending beyond said J-shaped hooks to provide a flat connecting section along said upper edge.

18. An assembly as set forth in claim 17 further including a pair of guides disposed on said flat connecting sections for providing a locator to assist in aligning respective second edges of said sheets with said flat connecting sections.

19. An assembly as set forth in claim 17 wherein said locking mechanism includes a resilient locking finger extending from said lower edge of one of said inboard and outboard portions with a notch formed in the other of said inboard and outboard portions such that said finger engages said notch during said locking of said portions.

20. An assembly as set forth in claim 19 wherein said finger and said notch are centrally formed between said plurality of J-shaped hooks.

* * * * *

UNITED STATES PATENT AND TRADEMARK OFFICE
CERTIFICATE OF CORRECTION

PATENT NO.    : 6,382,665 B2
DATED         : May 7, 2002
INVENTOR(S)   : Holdampf et al.

It is certified that error appears in the above-identified patent and that said Letters Patent is hereby corrected as shown below:

Column 10,
Line 43, after "another", insert -- and to prevent said inboard and outboard portions from sliding end to end relative to each other --.
Line 43, after "thereby", insert -- securely --.

Signed and Sealed this

Eighth Day of October, 2002

*Attest:*

*Attesting Officer*

JAMES E. ROGAN
*Director of the United States Patent and Trademark Office*